United States Patent
Allen

(10) Patent No.: US 10,458,479 B2
(45) Date of Patent: Oct. 29, 2019

(54) HIGH-SPEED SNAP RING AND SNAP RING RETENTION METHOD

(71) Applicant: Deere & Company, Moline, IL (US)

(72) Inventor: Kevin M. Allen, Bartlesville, OK (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/627,930

(22) Filed: Jun. 20, 2017

(65) Prior Publication Data

US 2017/0307021 A1    Oct. 26, 2017

Related U.S. Application Data

(63) Continuation of application No. 14/868,028, filed on Sep. 28, 2015, now Pat. No. 9,714,681.

(51) Int. Cl.
| | |
|---|---|
| *F16D 1/072* | (2006.01) |
| *F16D 1/06* | (2006.01) |
| *F16D 1/116* | (2006.01) |
| *F16B 21/18* | (2006.01) |

(52) U.S. Cl.
CPC ............. *F16D 1/06* (2013.01); *F16B 21/18* (2013.01); *F16B 21/186* (2013.01); *F16D 1/072* (2013.01); *F16D 1/116* (2013.01); *Y10T 29/49922* (2015.01); *Y10T 403/49* (2015.01)

(58) Field of Classification Search
CPC ........ F16B 2/245; F16B 7/0426; F16B 21/18; F16B 21/186; F16D 1/06; F16D 1/072; F16D 1/0894; F16D 1/116; Y10T 29/49922; Y10T 403/16; Y10T 403/1624;
(Continued)

(56) References Cited

U.S. PATENT DOCUMENTS

| | | | |
|---|---|---|---|
| 2,660,913 A | 12/1953 | Frisby | |
| 2,697,622 A * | 12/1954 | Leister | F16B 2/24 384/539 |
| 2,955,853 A | 10/1960 | Bendicsen | |

(Continued)

FOREIGN PATENT DOCUMENTS

| | | | |
|---|---|---|---|
| DE | 4007941 C1 * | 9/1990 | ............ F16B 21/183 |
| EP | 1681477 | 7/2006 | |

(Continued)

OTHER PUBLICATIONS

"Between." Dictionary.com. [online], [retrieved on Aug. 24, 2018]. Retrieved from the Internet <URL: https://www.google.com/search?q=define%3A+between>.*

(Continued)

*Primary Examiner* — Josh Skroupa
(74) *Attorney, Agent, or Firm* — Michael Best & Friedrich LLP

(57) ABSTRACT

A method of assembling a shaft assembly having a shaft defining a longitudinal axis and including a groove in an outer circumferential surface includes positioning a hub relative to the shaft and positioning a retaining ring in the groove of the shaft and adjacent to the hub. The method also includes securing a retaining member to the retaining ring. Securing a retaining member to the retaining ring includes advancing a portion of the retaining member towards the hub and deforming the portion relative to the retaining ring.

16 Claims, 4 Drawing Sheets

(58) Field of Classification Search
CPC ........... Y10T 403/32942; Y10T 403/49; Y10T 403/4966; Y10T 403/58; Y10T 403/581
USPC ............. 403/11, 14, 274, 282, 315, 36, 316; 464/182; 29/513
See application file for complete search history.

(56) References Cited

U.S. PATENT DOCUMENTS

| | | |
|---|---|---|
| 2,985,054 A | 5/1961 | Bramberry et al. |
| 3,709,574 A * | 1/1973 | Potter .................. F16C 35/073 384/585 |
| 4,464,090 A * | 8/1984 | Duran .................. F16B 41/002 411/103 |
| 6,773,214 B2 * | 8/2004 | Jakubowski, Jr. ...... F16B 21/18 411/353 |
| 2004/0028504 A1 | 2/2004 | Jakubowski, Jr. et al. |

FOREIGN PATENT DOCUMENTS

| | | | | |
|---|---|---|---|---|
| WO | WO 2015063423 A1 * | 5/2015 | ............ F16B 21/186 |
| WO | 2015117997 | 8/2015 | |

OTHER PUBLICATIONS

Specification Translation of DE 4007941. Boll, Wolf. Sep. 13, 1990. Circlip mounting for component on shaft—incorporates closed retaining ring to prevent centrifugal expansion of circlip.*

* cited by examiner

HIGH-SPEED SNAP RING AND SNAP RING RETENTION METHOD

CROSS-REFERENCE TO RELATED APPLICATIONS

This application is a continuation of U.S. patent application Ser. No. 14/868,028, filed Sep. 28, 2015, the entire contents of which are incorporated by reference herein.

BACKGROUND

The present disclosure relates to a shaft assembly and methods for manufacturing the same. In particular, the present disclosure relates to a retaining member that secures a retaining ring within a groove of a shaft. The present disclosure also relates to methods for constraining the motion of a retaining ring relative to a shaft.

SUMMARY

In one implementation, a method for assembling a shaft assembly having a shaft defining a longitudinal axis and including a groove in an outer circumferential surface includes positioning a hub relative to the shaft and positioning a retaining ring in the groove of the shaft and adjacent to the hub. The retaining ring includes an annular body that has a first end spaced apart from a second end and that defines an opening with an inner diameter. The first end includes a first aperture and the second end includes a second aperture. The method further includes inserting a first portion of a retaining member through the first aperture and a second portion of the retaining member through the second aperture. The first portion is connected to the second portion through an intermediate portion of the retaining member. The method further includes deforming at least one of the first portion or the second portion to secure the retaining member relative to the retaining ring.

In another implementation, a shaft assembly includes a shaft defining a longitudinal axis and having a groove in an outer surface. The assembly also includes a hub positioned on the shaft and a retaining ring positioned in the groove of the shaft and adjacent to the hub. The retaining ring includes an annular body that has a first end spaced apart from a second end and that defines an opening with an inner diameter. The first end includes a first aperture and the second end includes a second aperture. The assembly further includes a retaining member secured to the retaining ring and that has a first portion that extends through the first aperture and a second portion that extends through the second aperture. The first and the second portions are coupled on opposite sides of an intermediate portion and the first and the second portions are deformed as a result of contact with the hub In another implementation, a method for assembling a shaft assembly having a shaft defining a longitudinal axis and having a groove in an outer circumferential surface includes machining a hub to create a recess in an outer surface thereof, positioning the hub relative to the shaft, and positioning a retaining ring in the groove of the shaft and adjacent to the hub. The retaining ring includes an annular body that has a first end spaced apart from a second end. The method also includes securing a retaining member to the retaining ring to constrain the first end relative to the second end.

In another implementation, a method of assembling a shaft assembly having a shaft defining a longitudinal axis and including a groove in an outer circumferential surface includes positioning a hub relative to the shaft and positioning a retaining ring in the groove of the shaft and adjacent to the hub. The method also includes securing a retaining member to the retaining ring. Securing a retaining member to the retaining ring includes advancing a portion of the retaining member towards the hub and deforming the portion relative to the retaining ring.

In another implementation, a shaft assembly including a shaft defining a longitudinal axis and including a groove in an outer surface, a hub positionable on the shaft, a retaining ring positionable in the groove of the shaft and adjacent to the hub, and a retaining member including a first portion and a second portion. The first portion and the second portion are positionable between the hub and the retaining ring and deformable to secure the retaining member to the retaining ring.

Other aspects of the disclosure will become apparent by consideration of the detailed description and accompanying drawings.

DETAILED DESCRIPTION

Figure 1:
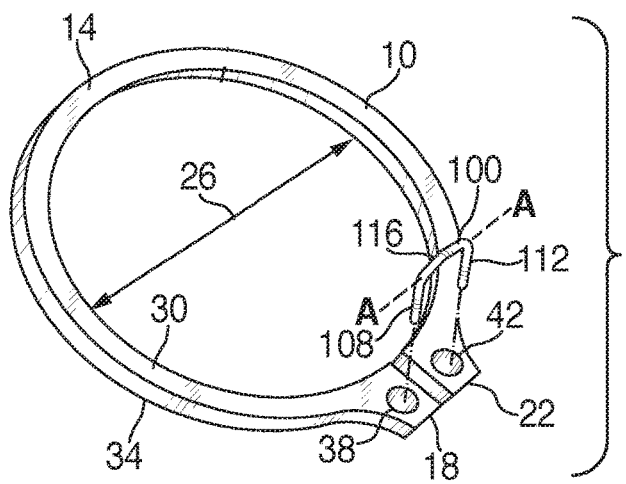
FIG. 1 illustrates an exploded view of a retaining ring and a retaining member.

Before any implementations of the disclosure are explained in detail, it is to be understood that the disclosure is not limited in its application to the details of implementation and the arrangement of components set forth in the following description or illustrated in the following drawings. The disclosure is capable of supporting other implementations and of being practiced or of being carried out in various ways.

FIGS. 1-6 illustrate a retaining ring 10, which includes a substantially annular body 14 defining an inner diameter 26 (FIG. 1) and presenting a first face 30 and a second face 34. The body 14 has a first end 18 with a first aperture 38 spaced apart from a second end 22 with a second aperture 42. The retaining ring 10 is resiliently expandable through manipulation of the ends 18, 22 such that the inner diameter 26 can be increased from a relaxed initial state for positioning the retaining ring 10 about, for example, a circumferential groove 50 (FIGS. 4 and 5) of a substantially cylindrical shaft 60, as will be discussed in greater detail below.

Figure 2:
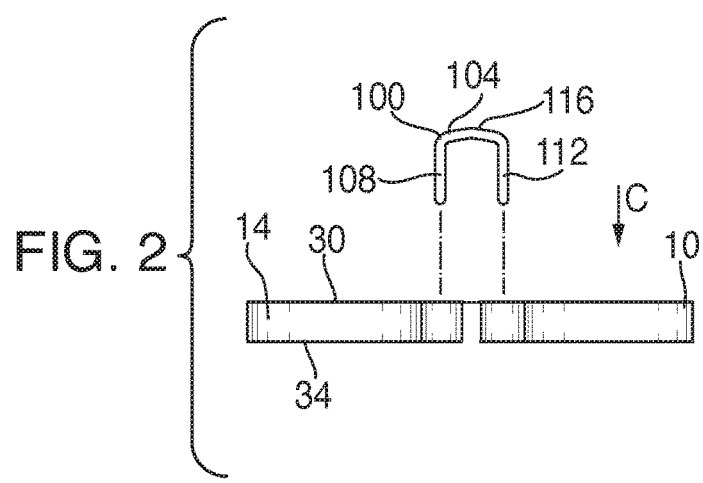
FIG. 2 illustrates a side view of the retaining ring and the retaining member of FIG. 1.
Figure 3:
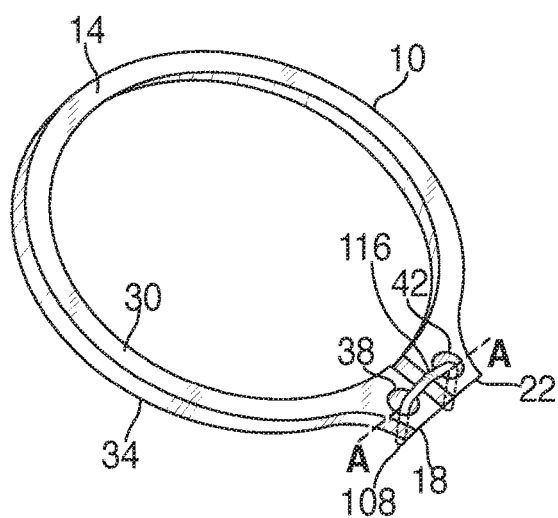
FIG. 3 illustrates a perspective view of the retaining ring and retaining member of FIG. 1.
Figure 4:
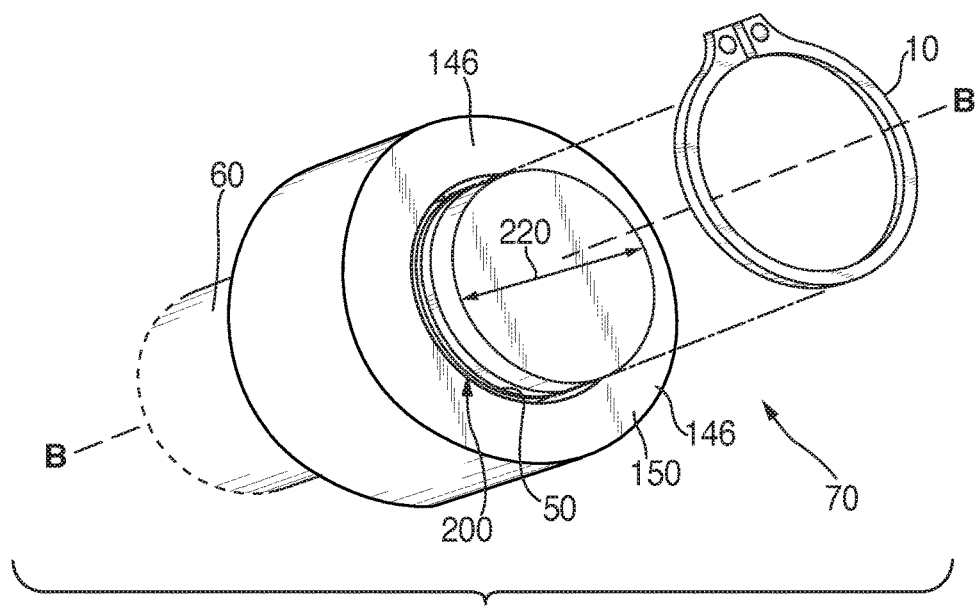
FIG. 4 illustrates a partially exploded view of a shaft assembly and a retaining ring.

FIGS. 1-3 also illustrate a retaining member 100 including a body 104 comprising a first portion or leg 108 and a second portion or leg 112 coupled on opposing sides of or otherwise integrally formed with an intermediate portion 116. An axis A is defined perpendicular to the legs 108, 112 of FIG. 1 and generally extending through the intermediate portion 116. In the illustrated implementation, the intermediate portion 116 may include a slight bend such that the intermediate portion 116 is not parallel to the axis A. Accordingly, with the aforementioned bend the retaining member 100 is pre-tensioned. In other words, the slight bend in the intermediate portion 116 biases the opposing ends of the intermediate portion 116 toward one another. In other implementations, however, the retaining member 100 may not have such a bend.

The first and the second portions 108, 112 are deformable, i.e., portions 108, 112 can deflect about the opposing ends of the intermediate portion 116 and relative to the intermediate portion 116. The retaining member 100 is formed from a high carbon steel, although other materials may be used that permit plastic or elastic deflection as previously described. In one embodiment, the retaining member 100 may be constructed from a carbon steel having a hardness level in the range of 45-52 on the Rockwell scale, i.e., just below the brittle range.

The retaining member 100 is configured to be coupled to the retaining ring 10 and to constrain the first end 18 relative to the second end 22. In particular, the first portion 108 is configured to be inserted into the first aperture 38 of the first end 18 of the retaining ring 10, and the second portion 112 is configured to be inserted into the second aperture 42 of the second end 22 of the retaining ring 10. The first and the second portions 108, 112 have a length greater than the thickness of the first and second ends 18, 22 such that the first and the second portions 108, 112 are extendable completely through the ends 18, 22.

The retaining ring 10 is configured to restrict axial movement of a hub or similar component relative to a rotating shaft. The shaft 60 and hub configurations 150, 152 shown in FIGS. 4-6 and that will be described below are merely exemplary schematics of a hub/shaft engagement configuration. While the cooperation of the shaft 60 and the hub 150, 152 is not specifically shown, it should be understood that shaft 60 is keyed into the hub 150, 152 or otherwise secured to the hub 150, 152 for co-rotation therewith.

Figure 5:
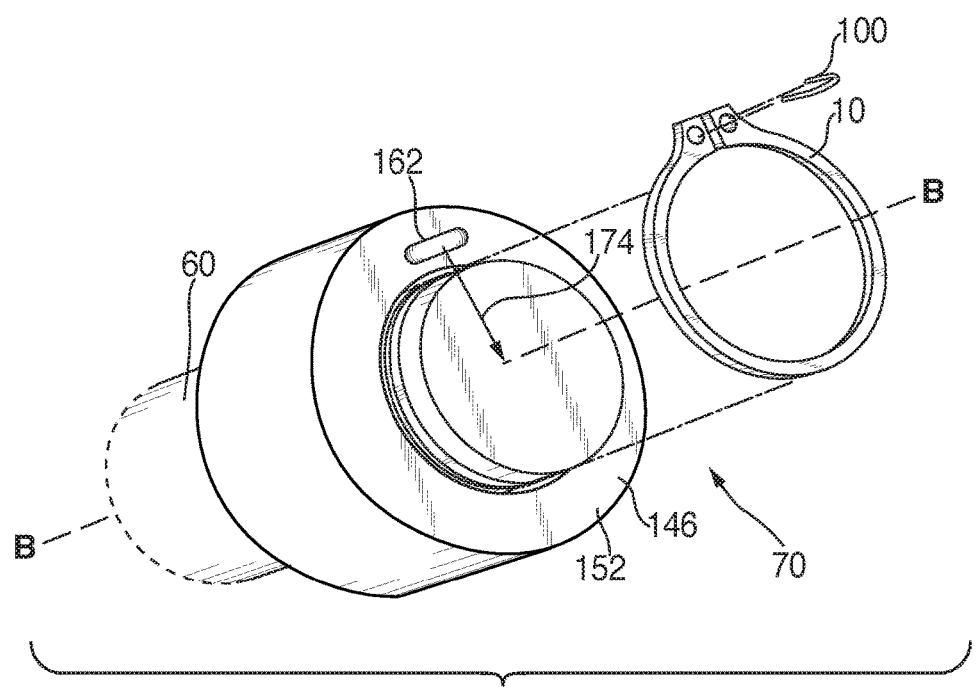
FIG. 5 illustrates a partially exploded view of the shaft assembly of FIG. 4 including a hub having a recess.
Figure 6:
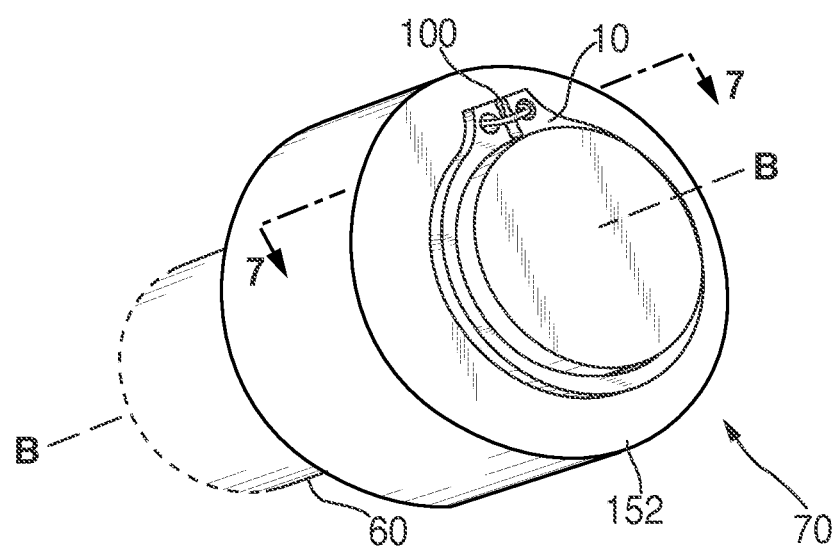
FIG. 6 illustrates a perspective view of the shaft assembly of FIG. 5 in an assembled state.

Referring to FIGS. 5 and 7-9, to facilitate use of the retaining member 100 in a shaft assembly, the axial face 146 of the hub 150 is machined (for example, by milling) to create the modified hub 152 comprising one or more recesses 162 spaced at a radial distance 174 (FIG. 5) from a longitudinal axis B of the shaft 60. The radial distance 174 is determined by the distance between the longitudinal axis B and the apertures 38, 42 of the first and second ends 18, 22 of the retaining ring 10 (FIG. 5).

The machined recesses define one or more contact surfaces 166 at an axial depth 172. For example and with reference to FIG. 7, the hub 150 may be machined to create a modified hub 152a comprising a single crescent-shaped or arcuate recess 162a that defines a substantially arcuate contact surface 166a with a depth 172a.

Figure 8:
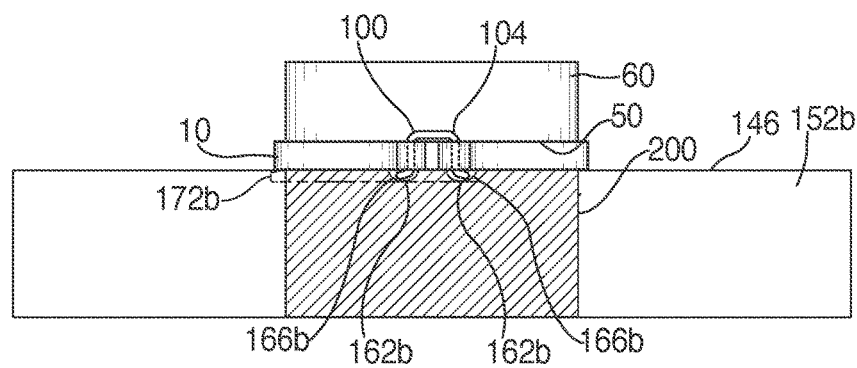
FIGS. 8 and 9 illustrate cross-sectional views of shaft assemblies taken along line 7-7 of FIG. 6 and including alternative recesses.

Alternatively and with reference to FIG. 8, the hub 150 may be machined to create a modified hub 152b comprising two separate arcuate recesses 162b that each define first and second substantially arcuate contact surfaces 166b with a depth 172b.

Figure 9:
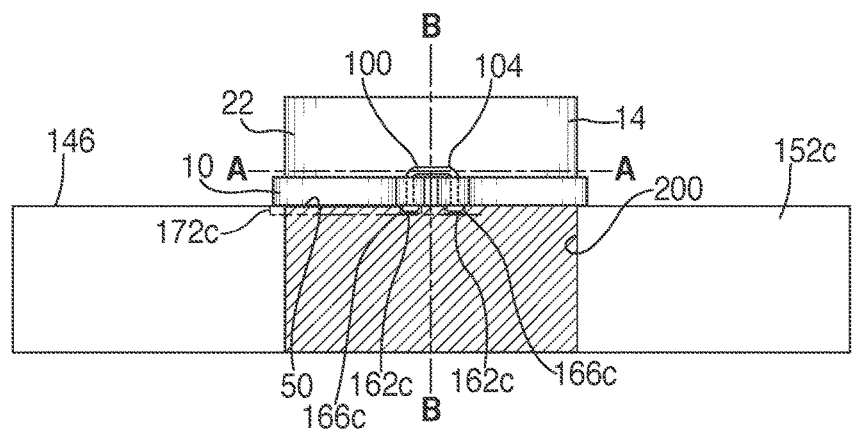

In yet another implementation illustrated in FIG. 9, the hub 150 may be machined to create a modified hub 152c comprising two generally rectangular (or squared) recesses 162c that each define first and second substantially planar contact surfaces 166c having a depth 172c and generally oriented parallel to the axial face 146.

In other implementations, the recesses 162 may have other suitable configurations with contact surfaces 166 that are positioned differently than illustrated herein. As an example, the arcuate recess 162a may be machined such that the contact surface 166a is convex rather than concave. In other embodiments, the contact surfaces 166 of the one or more recesses 162 may be oriented at any angle relative to the hub axial face 146, or have different axial depths. As examples, the contact surface 166 may be oriented at an angle of between 0 degrees and 90 degrees, at an angle of between 20 degrees and 70 degrees, at an angle of between 30 degrees and 60 degrees, or at an angle of between 35 and 55 degrees relative to the hub axial face 146.

The hub 150 can be modified to hub 152 as a separate component or modified once the shaft assembly 70 is partially assembled. With the shaft assembly 70 assembled such that a grooved shaft 60 extends through the hub aperture 200, the retaining ring 10 is positioned about the groove 50 adjacent to the modified hub 152. In particular, the retaining ring 10 is expanded from the relaxed initial state by conventional means such that the inner diameter 26 is able to receive an outer diameter 220 (FIG. 4) of the shaft 60. When the retaining ring 10 is positioned in the groove 50, which has a smaller diameter than the outer diameter 220 of the shaft 60, the retaining ring 10 is released back to substantially its initial inner diameter 26. Once the retaining ring 10 is appropriately positioned in the groove 50, the first and the second ends 18, 22 are positioned relative to one another such that the first and the second apertures 38, 42 radially overlay at least a portion of the one or more recesses 162 of the modified hub 152.

With reference again to FIGS. 1-3 and 5, and with the retaining ring 10 positioned in the assembly 70, the retaining member 100 is positioned relative to the retaining ring 10. In particular, the first portion 108 is inserted into the first aperture 38 of the retaining ring 10 and the second portion 112 is inserted into the second aperture 42 of the retaining ring 10. As the first and the second portions 108, 112 of the retaining member 100 are advanced in the direction of arrow C (FIG. 2), the first and the second portions 108, 112 deflect or deform in response to contact with a portion of the contact surfaces 166a-c of the one or more recesses 162a-c of the modified hub 152a-c. Such deformation transforms the retaining member 100 from an initial first configuration (FIG. 2) to a second configuration (FIGS. 6-9).

Figure 7:
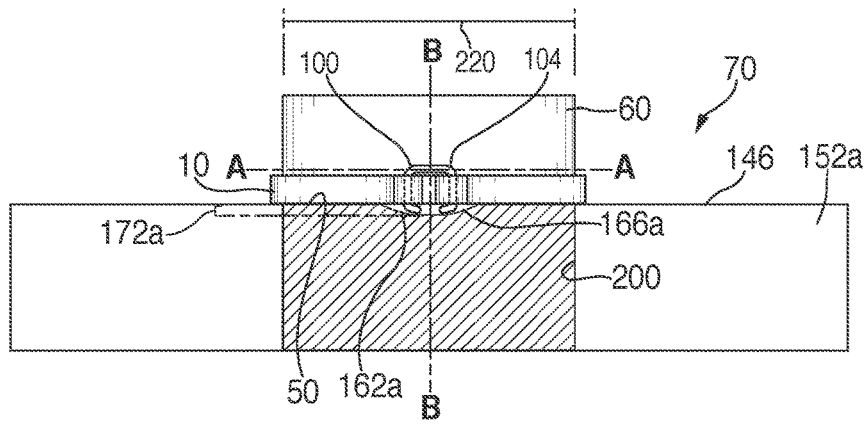
FIG. 7 illustrates a cross-sectional view of the shaft assembly of FIG. 6 taken along line 7-7 of FIG. 6.

The second configuration of the retaining member 100 is determined by the recess 162 of the modified hub 152. As shown in the implementation of FIG. 7, as the retaining member 100 is advanced in the direction of arrow C, contact with the contact surface 166a of the arcuate recess 162a of the modified hub 152a causes the first and the second portions 108, 112 to bend at least partially inward or towards each other. Accordingly, the first and second portions 108, 112 each deflect inwardly at an angle of up to 90 degrees relative to the initial first configuration of the retaining member 100. In the implementation of FIG. 8, as the retaining member 100 is advanced in the direction of arrow C, contact with the contact surfaces 166b of the recesses 162b of the modified hub 152b causes the first and the second portions 108, 112 to bend at least partially outward or away from each other. Accordingly, the first and second portions 108, 112 each deflect outwardly at an angle of up to 90 degrees relative to the initial first configuration. In the implementation of FIG. 9, the depth 172c of the rectangular recesses 162c is shorter than a length of the first and the second portions 108, 112 that extend beyond the second face 34, and as described the contact surface 166c is generally parallel to the axial face 146. Accordingly, as the retaining member 100 is advanced in the direction of arrow C, contact with the contact surfaces 166c of the rectangular recesses 162c upsets or distorts the ends of the first and the second portions 108, 112. As shown in FIG. 9, the first and the second portions 108, 112 are in response shorter and thicker at the ends in the second configuration than in the first configuration.

In other embodiments (not shown), the retaining ring when assembled is not abutting or adjacent to the axial surface of the hub. In such configurations, no relief or recess is necessary in the axial surface, and the first and second portions 108, 112 can be manually deformed or deflected from a first configuration into a second configuration similar to that of FIGS. 7-9. In yet other embodiments the first and second portions 108, 112 can be deformed or deflected in response to contact with the unmachined axial surface of the hub. In some embodiments, only one of the first and second portions 108, 112 need be deflected or deformed, either manually or through selective configuration of a recess 162.

In certain applications the rotational speed of the shaft 60 is sufficient to create enough centripetal force to open a retaining ring. Also, in some cases small rotational movement or vibration while under thrust load can "walk" a retaining ring out of the groove of the shaft. Regardless of the type or direction of deformation, in any of the implementations of FIGS. 7-9, the retaining member 100 in one of the second configurations mechanically constrains the ends 18, 22 of the retaining ring 10 relative to each other, or maintains a distance between the ends 18, 22, so that the ring 100 is retained within the groove 50. Further, the bend in the intermediate portion 116 ensures adjustable usage of the retaining member 100 such that it can adapt to different distances between the first and the second ends 18, 22 in any given retaining ring 10.

The structural and functional aspects described above are equally applicable to an internal retaining ring, i.e., a retaining ring in which the first and second ends are moved toward each other to collapse or decrease the internal diameter of the retaining ring to remove it from an internal shaft groove of a hollow shaft.

Various features and advantages of the disclosure are set forth in the following claims.

What is claimed is:

1. A method of assembling a shaft assembly, the shaft assembly including a shaft defining a longitudinal axis and including a groove in an outer circumferential surface, the method comprising:
    positioning a hub relative to the shaft;
    positioning a retaining ring in the groove of the shaft and adjacent to the hub; and
    securing a retaining member to the retaining ring,
    wherein securing the retaining member to the retaining ring includes advancing a portion of the retaining member towards the hub and deforming the portion relative to the retaining ring as a result of contact with the hub.

2. The method of claim 1, further comprising machining the hub to create a recess.

3. The method of claim 2, wherein deforming the portion includes deflecting the portion toward the longitudinal axis as the portion is advanced into the recess of the hub.

4. The method of claim 2, wherein deforming the portion includes deflecting the portion away from the longitudinal axis as the portion is advanced into the recess of the hub.

5. The method of claim 2, wherein machining the hub to create the recess includes creating a recess defining a contact surface that is at an angle of between 20 degrees and 70 degrees relative to an axial face of the hub.

6. The method of claim 2, wherein machining the hub to create the recess includes creating one of a concave, a convex, or a rectangular recess.

7. The method of claim 1, wherein advancing a portion of the retaining member includes deforming the portion relative to the remainder of the retaining member.

8. A shaft assembly comprising:
    a shaft defining a longitudinal axis and including a groove in an outer surface;
    a hub positionable on the shaft;
    a retaining ring positionable in the groove of the shaft and adjacent to the hub; and
    a retaining member including a first portion and a second portion, the first portion and the second portion being positionable axially between the hub and the retaining ring and deformable to secure the retaining member to the retaining ring.

9. The shaft assembly of claim 8, wherein the first and the second portion are deformable toward each other.

10. The shaft assembly of claim 8, wherein the first sand the second portion are deformable away from each other.

11. The shaft assembly of claim 8, wherein the hub includes a recess with a contact surface and wherein the first and the second portions of the retaining member are deformable upon contact with the contact surface, the contact surface being at an angle of between 20 degrees to 70 degrees relative to an axial face of the hub.

12. The shaft assembly of claim 11, wherein the recess is one of concave, convex, or rectangular in cross-sectional shape.

13. The shaft assembly of claim 8, wherein
    the retaining ring includes an annular body that has a first end spaced apart from a second end and that defines an opening with an inner diameter, the first end including a first aperture and the second end including a second aperture, and
    the retaining member defines an axis, the first portion being extendable through the first aperture and the second portion being extendable through the second aperture, the first and the second portions being positioned on opposite sides of an intermediate portion, the first and the second portions being deformable as a result of contact with the hub.

14. A method of assembling a shaft assembly, the shaft assembly including a shaft defining a longitudinal axis and including a groove in an outer surface, the method comprising:
    machining a hub to create a recess in an outer surface thereof;
    positioning the hub relative to the shaft;
    positioning a retaining ring in the groove of the shaft and adjacent to the hub, the retaining ring including an annular body that has a first end spaced apart from a second end and that defines an opening with an inner diameter; and
    securing a retaining member to the retaining ring to constrain the first end relative to the second end,
    wherein securing the retaining member to the retaining ring includes advancing a first portion and a second portion of the retaining member into the recess of the hub and deforming the first portion and the second portion of the retaining member.

15. The method of claim 14, wherein deforming the first portion and the second portion includes deflecting the first and the second portions.

16. The method of claim 14, wherein machining the hub to create the recess includes creating a recess defining a contact surface that is at an angle of between 30 degrees to 60 degrees relative to an axial face of the hub, the recess being one of concave, convex, or rectangular.

* * * * *